J. H. HOWARD.
TUG HOOK FOR HARNESS.
APPLICATION FILED APR. 24, 1916.

1,251,528.  Patented Jan. 1, 1918.

Witnesses

Inventor
J. H. Howard.

Attorney

UNITED STATES PATENT OFFICE.

JOHN H. HOWARD, OF COLFAX, WASHINGTON.

TUG-HOOK FOR HARNESS.

1,251,528.  Specification of Letters Patent.  Patented Jan. 1, 1918.

Application filed April 24, 1916. Serial No. 93,190.

*To all whom it may concern:*

Be it known that I, JOHN H. HOWARD, a citizen of the United States, residing at Colfax, in the county of Whitman and State of Washington, have invented a new and useful Tug-Hook for Harness, of which the following is a specification.

The object of my invention is to provide an improved tug hook for harness which in addition to being a butt-chain hook can be used for a doubletree or lead bar hook. It is further my object to provide a hook to which a tug can be readily and quickly engaged; to provide a hook which will not fail to secure the tug until manually disconnected from the tug; and to provide a hook adapted to accommodate a ring as well as a tug.

I attain the objects of my invention by the mechanism described hereinafter and illustrated in the accompanying drawings, in which—

Figure 1:
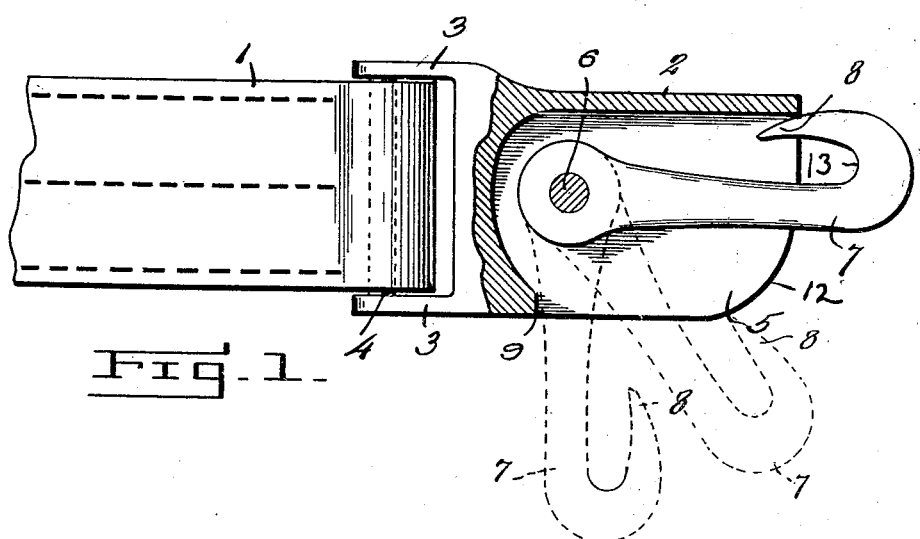
Figure 2:
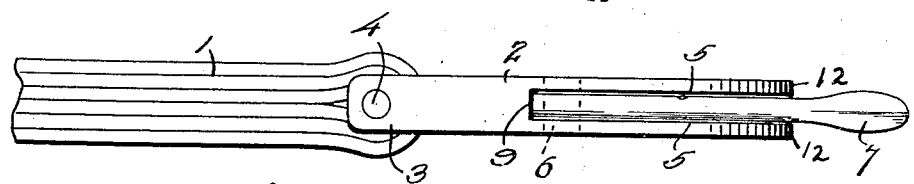
Figure 3:
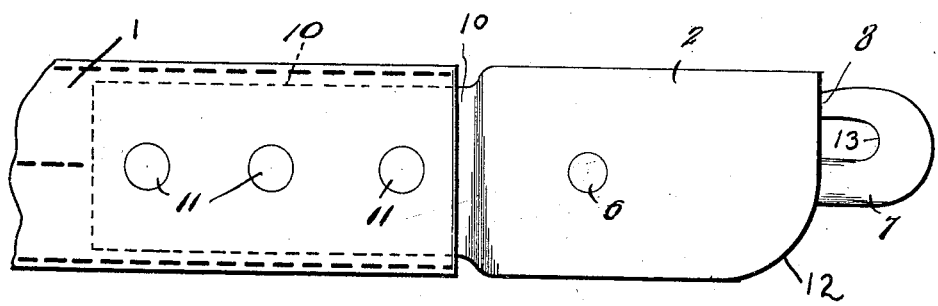

Figure 1 is a side elevation of my invention, partly in section, with the hook shown in different positions in dotted lines; Fig. 2 is a bottom plan of Fig. 1; and Fig. 3 is a side elevation of a modified form of the device with the hook in normal position.

Like numerals designate like parts throughout the several views.

Referring to the accompanying drawings, I provide a suitable winged tug hook housing 2 suitably attached to a tug. As shown in Figs. 1 and 2 I provide pivotal tug engaging means consisting of spaced arms 3 connected by pivot rod 4 extending through the looped end of the tug 1. Or I may provide a modified winged tug hook housing having a shank extension 10 adapted to be mounted within the end of a harness tug and rigidly secured to the tug by suitable means such as rivets 11. Tug hook housing 2 is provided with spaced wings 5, near the rear portion of which is pivotally mounted tug hook 7 on pivot 6, as shown in Fig. 1. Tug hook 7 is provided with a relatively large loop portion 13. By providing a hook that is relatively large at the point of contact, the usefulness of the hook is greatly increased. My hook, in addition to being a butt-chain hook, can be used for a doubletree or lead bar hook. I provide an extended pointed end 8 positioned within wings 5 when the tug hook 7 is in taut position. End 8 is arranged or positioned so as to extend within wings 5 until it drops below portion 12 of the wings 5 as indicated in dotted lines in Fig. 1. Portion 9 limits the movement of tug hook 7 as shown.

The operation of the device is indicated in the drawing. The positioning of end 8 within wings 5 prevents the tug from becoming disengaged from the tug hook when in use. Tug hook 7 must be lowered to the depending position adjacent to portion 9 of the housing to permit of disengagement of the tug. The relatively large loop portion 13 provides space for a ring and increases the usefulness of the device. The form of the device shown in Fig. 1 provides for a pivotal movement of the device relative to the tug.

What I claim is:—

1. The combination of a tug hook having a relatively large loop portion and an extended pointed end, a tug hook housing within which the tug hook is pivotally mounted, the aforesaid housing having extended side wings shaped to inclose the point of the tug hook when it is in a horizontal position and through an arc of over 45 degrees from said position, and having a portion positioned to limit the movement of the tug hook to an arc of 90 degrees, substantially as shown.

2. The combination of a tug hook having a relatively large loop portion and an extended end, a tug hook housing to which the tug hook is pivotally mounted, the housing having wings extended to inclose the point of the tug hook when extending horizontally of the housing and shaped to uncover the point of the hook only when moved to a nearly vertical depending position, an abutment portion to limit the movement of the hook, spaced arms extending rearwardly from the tug hook housing, and a rod connecting the arms by which the device may be pivotally engaged to a piece of harness, substantially as and for the purposes set forth.

3. The combination of a tug hook having a relatively large loop portion and an extended end, a tug hook housing within which the tug hook is pivotally mounted, said housing having extended side wings shaped to inclose the point of the tug hook when it is in a horizontal position and until it assumes a depending nearly vertical position, the upper portion of the housing being closed, the housing having a rear portion adapted to be secured to a piece of harness, substantially as shown.

JOHN H. HOWARD.

Witnesses:
WM. LE ROY LA FOLLETTE, Jr.
S. A. KIMBROUGH.